Dec. 14, 1971  T. HAAGEN ET AL  3,626,754
DISPLACEMENT TRANSDUCER HAVING AN OSCILLATING
TRANSMITTER ELEMENT
Filed July 9, 1969  3 Sheets-Sheet 1
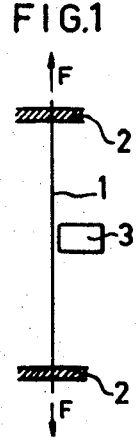  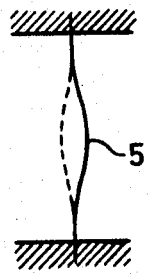 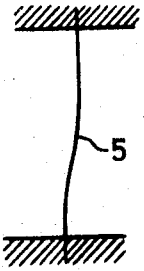
INVENTORS.
THOMAS HAAGEN &
CLAS-GÖRAN SKOOG
BY
their ATTORNEYS.

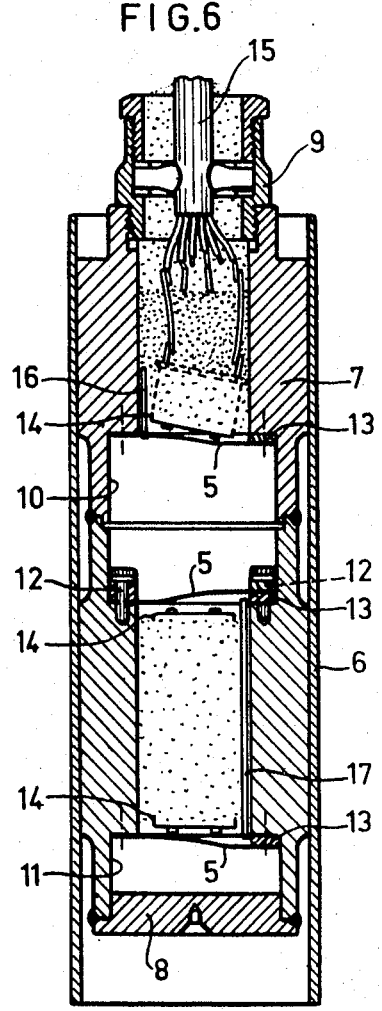

United States Patent Office 3,626,754
Patented Dec. 14, 1971

3,626,754
DISPLACEMENT TRANSDUCER HAVING AN OSCILLATING TRANSMITTER ELEMENT
Thomas Haagen and Clas-Goran Skoog, Nynahamn, Sweden, assignors to Rederiaktiebolaget Nordstjernan, Nynashamn, Sweden
Filed July 9, 1969, Ser. No. 840,151
Claims priority, application Sweden, July 12, 1968, 9,615/68
Int. Cl. G01l 5/12
U.S. Cl. 73—141 A          28 Claims

ABSTRACT OF THE DISCLOSURE

A transmitter element arranged to mechanically oscillate between fixed ends. The element takes the form of a rod, band or the like which is resistant to bending, and is curved in shape between its points of mounting. The transmitter element may be used for measuring forces, elongation, motion, etc. by monitoring changes in its oscillating frequency.

---

Figure 5:
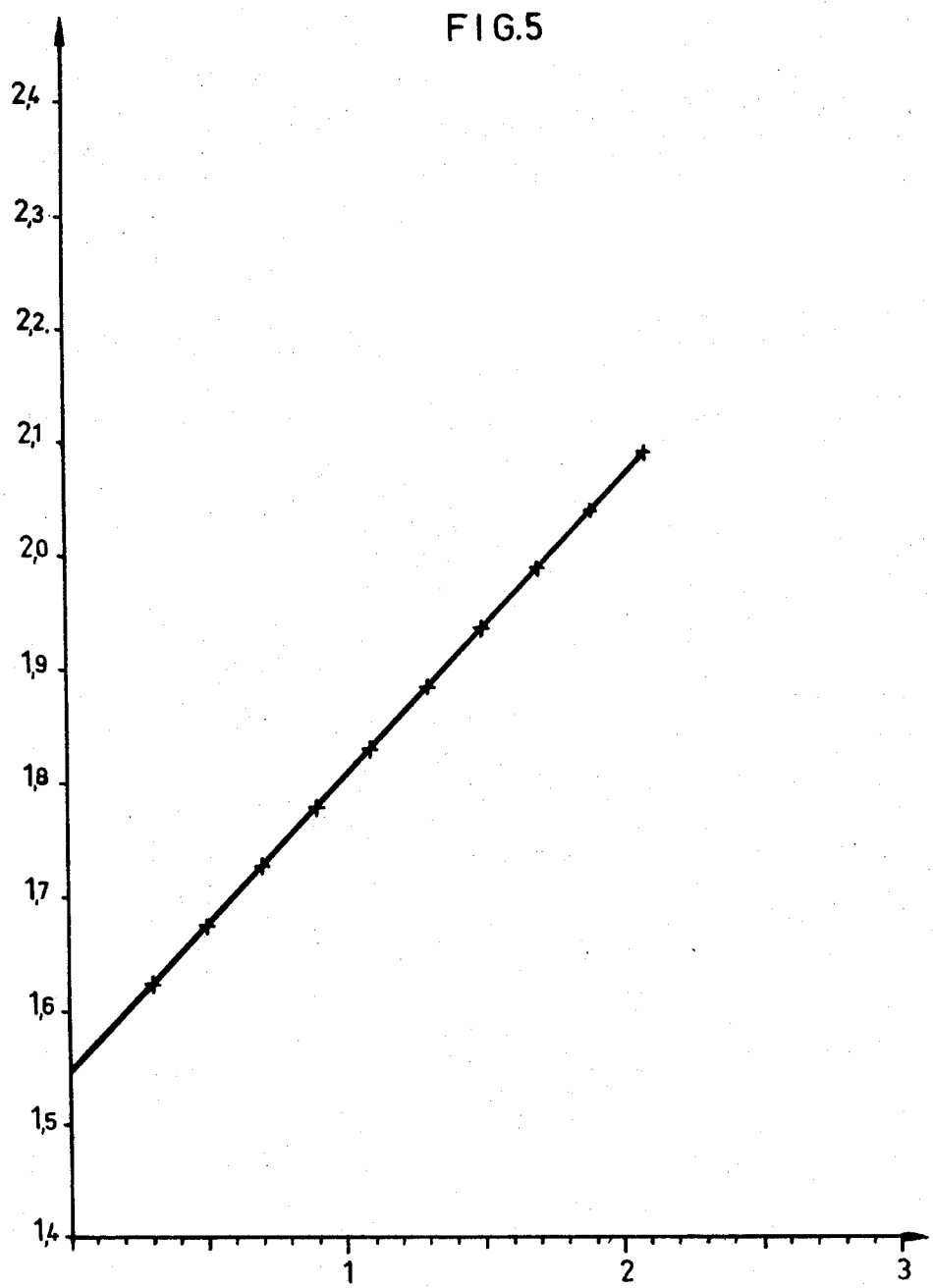

This invention relates to a transmitter in the form of an element oscillating between fixed ends for measuring forces, elongation, motion, etc.

Oscillating elements heretofore have been mounted in measuring instruments, for example dynamometers, in the form of straight drawn strings, the positive prestressing having been obtained by subjecting the string while being mounted to a tensile force. The measuring was carried out in such a manner, that an electromagnet was provided to the side of the string, by which electromagnet the frequency (natural frequency) of the string was determined. If the string is subjected to an external force via the mountings, the tension of the string and thereby the natural frequency change. The possible measuring range covered by this measuring method, however, is relatively small and there, further, is involved a certain risk of creeping between the straight drawn string and the mountings thereof, which creeping, especially at short string lengths, can give rise to a considerable zero deviation and, thus, to a substantial deterioration of the operational stability over long periods of time.

The aforesaid disadvantages are eliminated entirely or partially by the present invention by which, in addition, advantages are achieved which heretofore were not obtained.

The invention is substantially characterized in that the transmitter, which is a bending resistant rod, band or the like has a curved shape between its mounting points. It is to be observed that the term curved shape also includes angular shape.

The invention offers the possibility of using a transmitter which has a very short length and maintains a high output signal. The overall size of the measuring apparatus, for example of the dynamometer, can hereby be reduced considerably. Further advantages are the possibility of making the transmitter insensitive to temperature and of increasing its stability. An additional and very essential advantage of the curved bending-resistant rod according to the invention is that the possible measuring ranges can be extended substantially. One and the same rod can be used within measuring ranges for very small forces, elongations, motions, etc. as well as within ranges for great forces etc., by a simple change of the rod curvature. The sensitivity of the measurements can thus be varied within very wide limits. Still another important advantage is that by choosing a suitable prestressing for the transmitter it is possible to obtain a linear relation between elastic deformation and period time thus simplifying the measurements It can, finally, be mentioned that a transmitter according to the invention is easier to mount than, for example, the drawn strings mentioned in the introductory portion and that the transmitter is therefore advantageous also from a mounting point of view.

According to an advantageous embodiment of the bending-resistant a curved rod according to the invention, the rod portions located adjacent to the mounting points can be oriented along different axes which, for example, can extend in parallel with each other. An another advantageous embodiment of the invention, the bending-resistant curved rod portions located adjacent to the mounting points are oriented along a common axis. Said latter embodiment, however, may be less suitable than the firstmentioned embodiment in certain instances of loading, particularly if the transmitter is to undergo blows and impacts, as there may be a certain risk that the curved rod is knocked over to a position on the opposite side of said common axis line. This risk does not exist at the firstmentioned embodiment. With said firstmentioned embodiment, furthermore, the amplitude of oscillation of the rod can be considerably higher than with rods arranged according to the lastmentioned embodiment. Consequently, the output signal is greater and thereby renders possible a measuring equipment which is comparatively simpler and less sensitive to external disturbances. Furthermore, the mounting points of a rod secured in this way can be laterally displaced relative one another to a substantial degree without causing the measuring function to cease. Hereby it is possible to considerably extend the measuring ranges and to perform the setting on the desired range in a simple way.

According to the invention, furthermore, the curvature of the rod can be made permanent, i.e. the rod can be given its curved shape prior to mounting.

The advantage of an increase in operational stability applies particularly to cases where the rod according to the aforesaid embodiment of the invention is mounted with an axial compressive prestress. Hereby the risk of creeping between the rod and the mountings thereof are practically eliminated, owing to the fact that the forces in the rod are restricted to buckling forces. A further advantage obtained is the mechanically simpler way of mounting, compared with a drawn rod. This applies particularly to a comparison with a straight drawn rod. If a straight rod is mounted with axial compressive prestress, this involves a great risk of buckling. Said risk, however, is eliminated at the present invention where the rod in mounted state has curved shape. Due to the aforesaid advantages gained by the invention, however, even a drawn rod which is resistant to bending and has curved shape is an advantageous construction.

With the bending resistant curved rod according to the invention measurements also can be made without any axial prestress in the rod.

For reducing the effect of changes in temperature, according to a particular embodiment of the invention, the material of the rod can be chosen with a linear extension coefficient adjusted to the material of the measuring apparatus.

The invention is described in greater detail in the following with reference to the accompanying drawing.

FIG. 1 schematically shows a transmitter in the form of a string mounted in the manner known in the art.

FIGS. 2–4 schematically show mounted transmitters according to the present invention.

FIG. 5 shows a diagram of measurements carried out with a transmitter according to the invention.

FIG. 6, finally, shows a section through a dynamometer, for instance a rock stress gauge with mounted transmitters according to the invention.

A transmitter in the form of a string 1, according to what is shown in FIG. 1, heretofore was clamped at its ends in clamp holders 2 and thereby given a certain positive prestressing. This prestressing is obtained by subjecting the string at the moment of its mounting to a tensile force F.

The frequency (natural frequency) of the string can be determined by means of an electromagnet 3. If the string via the mountings is subjected to an external force, the tension and thereby the natural frequency of the string change.

The aforesaid measuring method which, thus, is based on the change of tension in a straight drawn string, constitutes the background of the present invention. The known measuring method involves, among other disadvantages, the risk of creeping between the straight drawn string and the mounting of the string. This can result in a great zero deviation and, thus, a considerably deteriorated operational stability over long periods of time, particularly at short string lengths which are desirable from a dynamometer volume point of view.

By a transmitter according to the present invention it has become possible to reduce said creeping or to eliminate it entirely, and the prerequisite conditions for meeting the stability requirement have been improved. FIGS. 2–4 show different examples of the transmitter according to the invention which is a bending-resistant element having a curved shape between the mounting. The element may be mounted with axial compressive prestressing or with axial tensile prestressing. It also may have no axial prestressing. The oscillating bending-resistant and curved element 5 is a rod, a band or the like.

By using as oscillating element such a bending-resistant curved rod instead of the usual oscillating string, advantageous results are obtained. It is possible to use elements of considerably shorter length than with the transmitter according to FIG. 1, and also to use a mechanically simpler mounting. Moreover, by changing the curved shape the measuring ranges can be extended substantially in a simple way.

FIG. 2 is intended to show the rod 5 articulated at its ends or loosely mounted in grooves, holes or the like, while FIG. 3 illustrates the rod 5 with fixed ends for preventing the loss of oscillating energy. An arrangement of the rods 5 in accordance with FIGS. 2 and 3 meets all requirements in a fully satisfactory manner in most of the cases. Under certain instances of loading and a certain cross-section of the rod, however, there may be a risk that the rod shifts over to the opposite position indicated by dashed lines.

With the embodiment shown in FIG. 4 also this last-mentioned risk is eliminated. The mountings of the rod 5 are here laterally displaced whereby the rod is fixed in a definite initial position. Practical tests, moreover, have shown that the amplitude of oscillation of the rod is substantially higher, which results in an increased output signal and renders possible simpler measuring equipment which is less sensitive to external disturbances.

The rods may be given a shape different from that shown in FIGS. 2–4. Said shaping may also be made permanent, i.e. the rod may have a given shape prior to its mounting. The rods, moreover, may have different cross-sections, for example rectangular, triangular, semicircular, elliptic, etc. By choosing the cross-section the output signal can be varied, the mechanical stability affected and the mounting of the rod simplified.

FIG. 5 illustrates still another essential advantage which is achieved by a transmitter in the form of a bending-resistant, curved rod according to the invention. The diagram in FIG. 5, in which along the abscissa is plotted the load in tons applied to a force measuring instrument containing the transmitter and along the ordinate the transmitter period time in milliseconds, shows a linear relation between elastic deformation and period time. Said linear relation is achieved by choosing a suitable prestressing of the rod. It is, thus, possible to considerably simplify measurements with a transmitter according to the invention. FIG. 6, finally, shows an axial central section through a dynamometer, for instance a rock stress gauge, in which at axially different distances three transverse band-shaped transmitters 5 are mounted in accordance with FIG. 5. By means of these bands and their mounting the dynamometer can be designed considerably smaller than conventional dynamometers with an equally high output signal. The transmitters, moreover, are operationally stable and insensitive to temperature, and their measuring ranges can be changed within wide limits by a simple change of the curved shape. The remaining details of the dynamometer which are not included in the invention are briefly as follows. An external expanding sleeve 6 encloses a hollow body 7 which is formed of two parts welded together. This body is closed by a cover 8 welded on at one end and provided at the other end with a cable passage sleeve 9 threaded on. In the widened hollow spaces 10 and 11 the rods 5 are secured by screw connections so as to abut at one end to the end surfaces of the hollow space in question and at the other end to distance pieces 13 for effecting the desired curved rod shape. Adjacent to every rod a magnet 14 is mounted. The cable drawn to the measuring instrument with lines to the magnet in question is shown at 15. The magnets, lines and cable are casting in cast compounds. Air ducts 16 and 17 are also provided to permit equalization of the air pressure throughout the device.

The dynamometer of FIG. 6 operates to measure forces applied transversely to the sleeve 6. These forces are transmitted to the three rod elements 5 which are caused to oscillate at their resonant frequencies by their associated electromagnets 14. The forces result in a proportionate displacement between the mounting points of the rod elements which changes the period of oscillation in the manner indicated in FIG. 5.

What we claim is:
1. A transducer for indicating the relative displacement between first and second elements, comprising:
   (a) an elongate transmitter element having first and second ends and adapted to vibrate with lateral bending oscillations,
   (b) mounting means on said first and second elements in contact with said first and second ends of said transmitter element, respectively, and holding said transmitter element, when in a non-oscillating condition, in the shape of a curve lying substantially in a single plane,
   (c) means positioned adjacent to said transmitter element for causing it to vibrate mechanically with lateral bending oscillations at a resonant frequency dependent upon the relative displacement of said elements and for sensing said resonant frequency as an indication of said relative displacement.

2. The transducer defined in claim 1, wherein said transmitter element is resistant to bending between its ends.

3. The apparatus defined in claim 2 wherein the mounting means functions to mount at least one of said two ends of the transmitter element so that it is articulated at its mounting position.

4. The apparatus defined in claim 2, wherein said transmitter element is rod-shaped.

5. The apparatus defined in claim 2, wherein said transmitter element is band-shaped.

6. The apparatus defined in claim 2, wherein said mounting means comprises means to mount each of said two ends of said transmitter element in a fixed position.

7. The apparatus defined in claim 6, wherein those portions of said transmitter element which are located adjacent to the mounting positions extend in parallel with each other.

8. The apparatus defined in claim 6, wherein the mounting means comprises clamps holding the two ends at said fixed positions.

9. The apparatus defined in claim 2, wherein those portions of said transmitter element which are located adjacent to the mounting positions are oriented along different axes.

10. The apparatus defined in claim 2, wherein those portions of said transmitter element which are located adjacent to the mounting positions are oriented along a common axis.

11. The apparatus defined in claim 2, wherein said transmitter element has a curved shape in an unstressed state.

12. The apparatus defined in claim 2, wherein said transmitter element is mounted with an axial compressive prestress.

13. The apparatus defined in claim 2, wherein said transmitter element is mounted with an axial tensile prestress.

14. The apparatus defined in claim 2, wherein said transmitter element is mounted without an axial prestress.

15. Measuring apparatus for indicating the relative displacement between first and second elements, comprising:
(a) a housing,
(b) a transducer in the housing including:
(i) an elongate transmitter element having first and second ends and adapted to vibrate with lateral bending oscillations,
(ii) mounting means in the housing on said first and second elements in contact with said first and second ends of said transmitter element, respectively, and holding said transmitter element, when in a non-oscillating condition, in the shape of a curve lying substantially in a single plane,
(iii) means positioned adjacent to said transmitter element for causing it to vibrate mechanically with lateral bending oscillations at a resonant frequency dependent upon the relative displacement of said elements and for sensing said resonant frequency as an indication of said relative displacement,
(c) conductive coupling means extending through the housing to the sensing means.

16. The apparatus defined in claim 15, wherein said transmitter element is resistant to bending between its ends.

17. The apparatus defined in claim 16, wherein the mounting means functions to mount at least one of said two ends of the transmitter element so that it is articulated at its mounting position.

18. The apparatus defined in claim 16, wherein said transmitter element is rod-shaped.

19. The apparatus defined in claim 16, wherein said transmitter element is band-shaped.

20. The apparatus defined in claim 16, wherein said mounting means comprises means to mount each of said two ends of said transmitter element in a fixed position.

21. The apparatus defined in claim 20, wherein those portions of said transmitter element which are located adjacent to the mounting positions extend in parallel with each other.

22. The apparatus defined in claim 20, wherein the mounting means comprises clamps holding the two ends at said fixed positions.

23. The apparatus defined in claim 16, wherein those portions of said transmitter element which are located adjacent to the mounting positions are oriented along different axes.

24. The apparatus defined in claim 16, wherein those portions of said transmitter element which are adjacent to the mounting positions are oriented along a common axis.

25. The apparatus defined in claim 16, wherein said transmitter element has a curved shape in an unstressed state.

26. The apparatus defined in claim 16, wherein said transmitter element is mounted with an axial compressive prestress.

27. The apparatus defined in claim 16, wherein said transmitter element is mounted with an axial tensile prestress.

28. The apparatus defined in claim 16, wherein said transmitter element is mounted without an axial prestress.

References Cited

UNITED STATES PATENTS

| | | | |
|---|---|---|---|
| 2,880,612 | 4/1959 | Coyne | 73—88.5 |
| 3,093,760 | 6/1963 | Tarasevich | 310—9.1 |
| 3,197,753 | 7/1965 | Voutsas | 340—207 |
| 3,411,347 | 11/1968 | Wirth et al. | 73—141 |
| 3,371,536 | 3/1968 | Tellerman | 73—386 |
| 3,434,352 | 3/1969 | Jewell et al. | 73—517 |
| 3,486,383 | 12/1969 | Riordan | 73—517 |
| 3,182,495 | 5/1965 | Johnson | 73—141 |

FOREIGN PATENTS

| | | | |
|---|---|---|---|
| 861,325 | 8/1970 | Great Britain | G08—C |

RICHARD C. QUEISSER, Primary Examiner

J. WHALEN, Assistant Examiner

U.S. Cl. X.R.

33—143; 73—517 AV, 133